(12) United States Patent
Song

(10) Patent No.: US 7,812,911 B2
(45) Date of Patent: Oct. 12, 2010

(54) LIQUID CRYSTAL DISPLAY

(75) Inventor: Sang Moo Song, Daegu (KR)

(73) Assignee: LG Display Co., Ltd., Seoul (KR)

( * ) Notice: Subject to any disclaimer, the term of this patent is extended or adjusted under 35 U.S.C. 154(b) by 663 days.

(21) Appl. No.: 10/326,373

(22) Filed: Dec. 23, 2002

(65) Prior Publication Data

US 2003/0197823 A1 Oct. 23, 2003

(30) Foreign Application Priority Data

Apr. 20, 2002 (KR) .............................. 2002-21792

(51) Int. Cl.
*G02F 1/1343* (2006.01)
(52) U.S. Cl. ..................................... 349/145
(58) Field of Classification Search ................. 349/139, 349/143
See application file for complete search history.

(56) References Cited

U.S. PATENT DOCUMENTS

| | | | | |
|---|---|---|---|---|
| 4,812,017 A | * | 3/1989 | Piper | 349/144 |
| 4,920,409 A | * | 4/1990 | Yamagishi | 348/791 |
| 5,253,091 A | * | 10/1993 | Kimura et al. | 345/94 |
| 6,140,990 A | * | 10/2000 | Schlig | 345/92 |
| 6,160,535 A | * | 12/2000 | Park | 345/88 |
| 6,563,482 B1 | * | 5/2003 | Yamazaki et al. | 345/87 |

FOREIGN PATENT DOCUMENTS

KR 0242443 2/2000

* cited by examiner

*Primary Examiner*—Timothy Rude
(74) *Attorney, Agent, or Firm*—McKenna Long & Aldridge LLP

(57) ABSTRACT

A liquid crystal display includes a liquid crystal display panel driven by a dot inversion method using a data driver driven by a column inversion method. Within the liquid crystal display, liquid crystal cells capable of expressing any one color are alternately arranged adjacent left and right sides along the length of a data line.

13 Claims, 8 Drawing Sheets

| + | − | + | − | + | − | + | − |
|---|---|---|---|---|---|---|---|
| + | − | + | − | + | − | + | − |
| + | − | + | − | + | − | + | − |
| + | − | + | − | + | − | + | − |
| + | − | + | − | + | − | + | − |
| + | − | + | − | + | − | + | − |
| + | − | + | − | + | − | + | − |
| + | − | + | − | + | − | + | − |

FIG.3B
RELATED ART

| − | + | − | + | − | + | − | + |
|---|---|---|---|---|---|---|---|
| − | + | − | + | − | + | − | + |
| − | + | − | + | − | + | − | + |
| − | + | − | + | − | + | − | + |
| − | + | − | + | − | + | − | + |
| − | + | − | + | − | + | − | + |
| − | + | − | + | − | + | − | + |
| − | + | − | + | − | + | − | + |

FIG.4A
RELATED ART

| + | − | + | − | + | − | + | − |
|---|---|---|---|---|---|---|---|
| − | + | − | + | − | + | − | + |
| + | − | + | − | + | − | + | − |
| − | + | − | + | − | + | − | + |
| + | − | + | − | + | − | + | − |
| − | + | − | + | − | + | − | + |
| + | − | + | − | + | − | + | − |
| − | + | − | + | − | + | − | + |

FIG.4B
RELATED ART

| − | + | − | + | − | + | − | + |
|---|---|---|---|---|---|---|---|
| + | − | + | − | + | − | + | − |
| − | + | − | + | − | + | − | + |
| + | − | + | − | + | − | + | − |
| − | + | − | + | − | + | − | + |
| + | − | + | − | + | − | + | − |
| − | + | − | + | − | + | − | + |
| + | − | + | − | + | − | + | − |

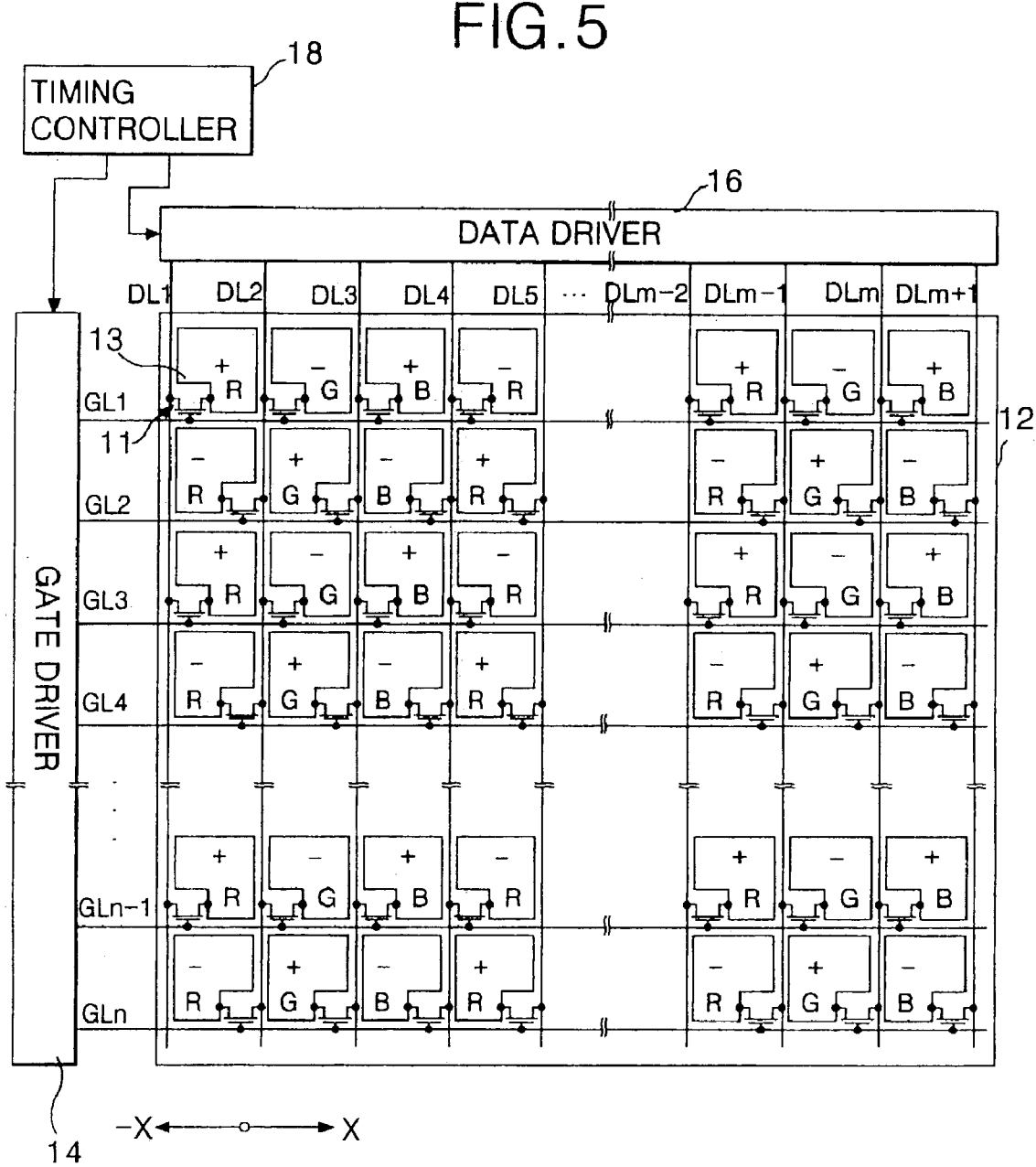

LIQUID CRYSTAL DISPLAY

This application claims the benefit of Korean Patent Application No. 2002-21792, filed on Apr. 20, 2002, which is hereby incorporated by reference for all purposes as if fully set forth herein.

BACKGROUND OF THE INVENTION

1. Field of the Invention

The present invention relates to a liquid crystal display, and more particularly to a liquid crystal display driven according to a dot inversion method using a data driver driven according to a column inversion method, wherein swing widths of video data signals may be minimized.

2. Description of the Related Art

Generally, liquid crystal displays typically include a liquid crystal display panel having a plurality of liquid crystal cells arranged in a matrix pattern and driving circuit for driving the liquid crystal display panel. To display pictures, liquid crystal displays control light transmittance characteristics of the liquid crystal cells in accordance with inputted video signals.

The liquid crystal cells are located at areas defined by crossings of gate lines and data lines. Each the liquid crystal cell is provided with a common electrode and a pixel electrode with which an electric field may be generated. Each pixel electrode is connected to a corresponding data line via a switching device such as a thin film transistor (TFT). A terminal of a TFT is connected to a gate line such that video signals may be applied to corresponding pixel electrodes. The driving circuit includes a gate driver for driving gate lines, a data driver for driving data lines, and a common voltage generator for driving the common electrode.

The gate driver sequentially scans the gate lines of the liquid crystal display panel, supplies gate signals to gate lines, and drives the liquid crystal cells on the liquid crystal display panel one gate line at a time. Whenever a gate signal is supplied to a gate line, the data driver supplies suitable video signals to each of the data lines crossing that scanned gate line while the common voltage generator supplies common voltage signals to the common electrode. Depending on the video signal applied to the data line, an orientation of molecules of liquid crystal material provided within the liquid crystal cell, between the pixel and common electrodes, may be altered and the light transmittance of the liquid crystal cell may be controlled. Accordingly, as the light transmittances of each of the liquid crystal cells in the liquid crystal display panel are individually controlled, the liquid crystal display panel may display a picture.

FIG. 1 illustrates a schematic view of a related art liquid crystal display.

Referring to FIG. 1, liquid crystal displays typically include a liquid crystal display panel 2 having a plurality of liquid crystal cells arranged in a matrix pattern, a gate driver 4 for driving gate lines GL1 to GLn arranged in the liquid crystal display panel 2, and a data driver 6 for driving data lines DL1 to DLm also arranged in the liquid crystal display panel 2.

Each of the liquid crystal cells include a TFT that responds to gate signals applied to the gate lines GL1 to GLn by supplying video signals, applied to the data lines DL1 to DLm, to the liquid crystal cells. Each liquid crystal cell can be represented as a pixel electrode and a common electrode connected to each other via a TFT and a liquid crystal capacitor Clc. A storage capacitor (not shown), for maintaining a voltage of the video signal, is included within the liquid crystal cell. The storage capacitor maintains the charge within liquid crystal capacitor Clc until the next video signal is supplied.

Storage capacitors of liquid crystal cells are formed between preceding (i.e., pre-stage) gate electrodes and pixel electrodes of each liquid crystal cell. The gate driver 4 sequentially applies gate signals to gate lines GL1 to GLn to drive the corresponding TFTs. The data driver 6 converts inputted video data into analog video signals and supplies analog video signals, specific to the scanned gate line, to the data lines DL1 to DLm during the period when the gate signal is supplied to the scanned gate line. Additionally, the data driver 6 converts inputted video data into analog video signals using gamma voltages supplied from a gamma voltage generator (not shown).

Liquid crystal cells within liquid crystal display panels such as those illustrated in FIG. 1 may be driven according to various inversion methods including frame, line, column, and dot inversion methods.

When driven according to the frame inversion method, the polarity of video signals supplied to the liquid crystal cells is inverted every frame.

Referring to FIGS. 2A and 2B, when driven according to the line inversion method, the polarity of video signals supplied to liquid crystal cells connected to a gate line is opposite the polarity of video signals supplied to liquid crystal cells connected to gate lines adjacent that gate line. Further, the polarities of the video signals applied to the liquid crystal cells are inverted every frame. Driving liquid crystal cells by the line inversion method, however, is disadvantageous in that a flicker phenomenon is induced in horizontal lines due to electrical cross-talk between liquid crystal cells arranged along the gate lines.

Referring to FIGS. 3A and 3B, when driven according to the column inversion method, the polarity of video signals supplied to liquid crystal cells connected to a data line is opposite the polarity of video signals supplied to liquid crystal cells connected to data lines adjacent that data line. Further, the polarities of the video signals applied to the liquid crystal cells are inverted every frame. Driving liquid crystal cells by the column inversion method, however, is disadvantageous in that a flicker phenomenon is induced in vertical lines due to electrical cross-talk between liquid crystal cells arranged along the data lines.

Referring to FIGS. 4A and 4B, when driven according to the dot inversion method, the polarity of video signals supplied to a liquid crystal cell is opposite the polarity of video signals supplied to adjacent liquid crystal cells (e.g., liquid crystal cells connected to adjacent gate and data lines). Further, the polarities of the video signals applied to the liquid crystal cells are inverted every frame. Driving liquid crystal cells by the dot inversion method offsets any flicker phenomenon that may be induced between vertically or horizontally adjacent liquid crystal cells . Accordingly, pictures generated by the liquid crystal display panel driven using the dot inversion method have superior qualities over pictures generated by liquid crystal display panels driven using other inversion methods.

Use of the dot inversion method, however, is disadvantageous in that the polarity of video signals supplied from the data driver to the data line need to be inverted in horizontal and vertical directions and individual pixel voltages required by the dot inversion method are typically greater than those required by other inversion methods. Accordingly, liquid crystal displays driven using a dot inversion method typically consume a relatively large amount of power during their operation.

SUMMARY OF THE INVENTION

Accordingly, the present invention is directed to a liquid crystal display that substantially obviates one or more of the problems due to limitations and disadvantages of the related art.

An advantage of the present invention provides a liquid crystal display driven by a dot inversion method using a data driver driven by a column inversion method, wherein such a liquid crystal display is capable of consuming a relatively small amount of power during its operation.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display according to an embodiment of the present invention may include liquid crystal cells expressing red, green, and blue colors, wherein liquid crystal cells consecutively arranged within a column may be alternately connected to data lines adjacent to left and right sides of the liquid crystal cells.

In one aspect of the present invention, liquid crystal cells capable of displaying two colors may be alternately arranged within a column.

In another aspect of the present invention, liquid crystal cells capable of displaying red and green colors may be alternately arranged within every $i^{th}$ column wherein i is an integer, e.g., 1, 4, 7, etc.).

In another aspect of the present invention, liquid crystal cells capable displaying green and blue colors may be alternately arranged within every $(i+1)^{th}$ column.

In another aspect of the present invention, liquid crystal cells capable of displaying blue and red colors may be alternately arranged within every $(i+2)^{th}$ column.

In yet another aspect of the present invention, any one of a red, green, or blue video signals may be applied to each of the data lines.

In still another aspect of the present invention, liquid crystal cells capable of expressing a same color may be alternately arranged adjacent left and right sides along the length of a data line.

In accordance with the principles of the present invention, a liquid crystal display may include gate lines, data lines crossing the gate lines, and liquid crystal cells capable of expressing red, green, and blue colors may be provided at locations corresponding to where the gate lines cross the data lines, wherein liquid crystal cells consecutively arranged within a column may be alternately connected to data lines adjacent to left and right sides of the liquid crystal cells.

In the liquid crystal display, liquid crystal cells capable of displaying two colors may be alternately arranged within a column.

In another aspect of the present invention, liquid crystal cells capable of displaying red and green colors may be alternately arranged within every $i^{th}$ column (wherein i is an integer, e.g., 1, 4, 7, etc.).

In another aspect of the present invention, liquid crystal cells capable of displaying green and blue colors may be alternately arranged within every $(i+1)^{th}$ column.

In another aspect of the present invention, liquid crystal cells capable of displaying blue and red colors may be alternately arranged within every $(i+2)^{th}$ column.

In yet another aspect of the present invention, any one of a red, green, or blue video signal only is applied to each of the data lines.

In still another aspect of the present invention, liquid crystal cells capable of displaying a red, green, or blue colors may be alternately arranged on left and right sides along a length of a data line.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

Figures 2A, 2B:
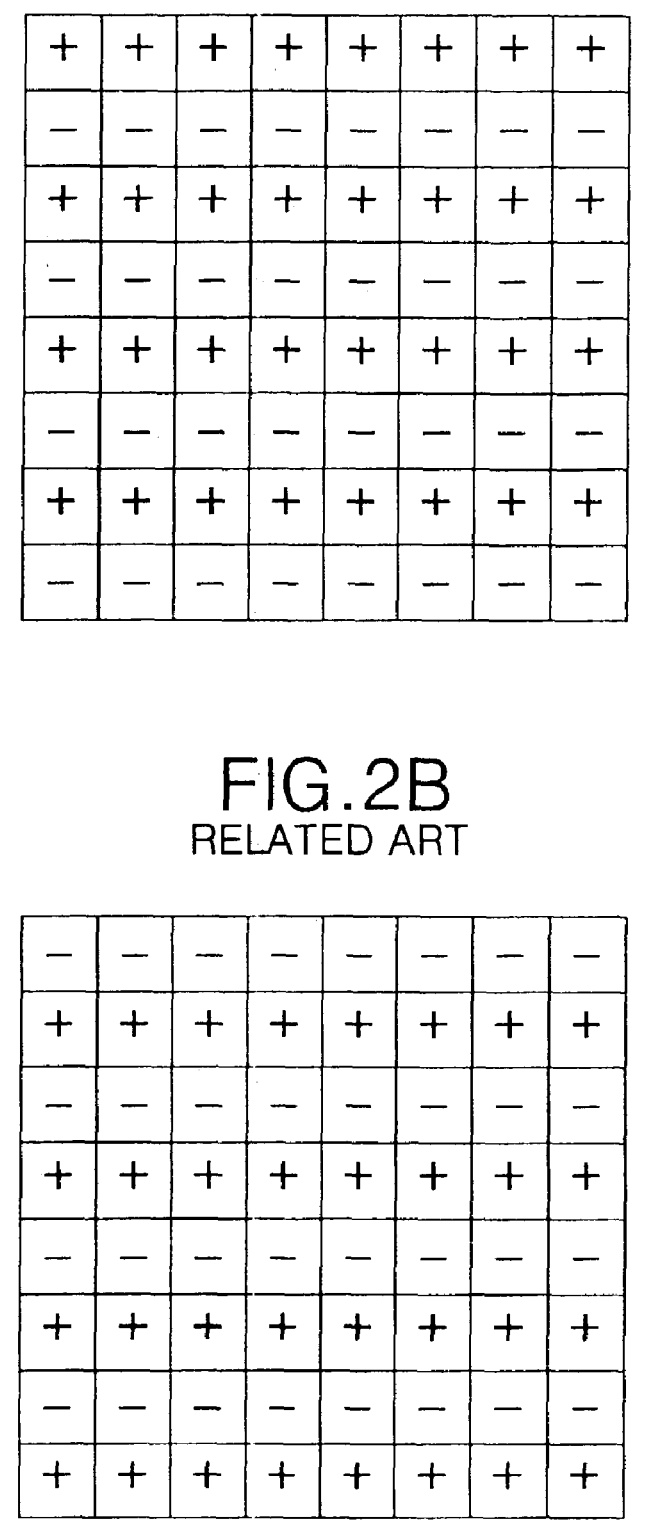

FIGS. 2A and 2B illustrate a line inversion method of driving a related art liquid crystal display;

Figures 3A, 3B:
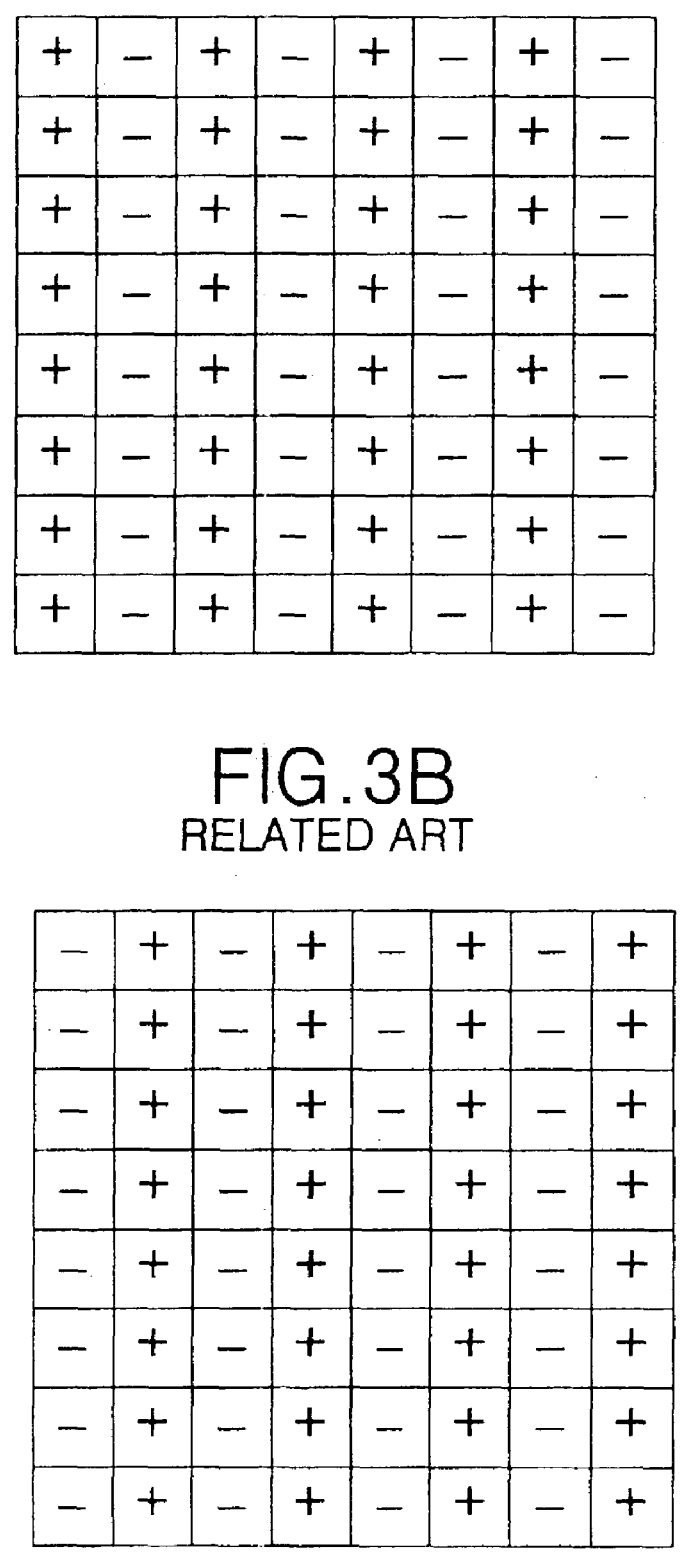

FIGS. 3A and 3B illustrate a column inversion method of driving a related art liquid crystal display;

Figures 4A, 4B:
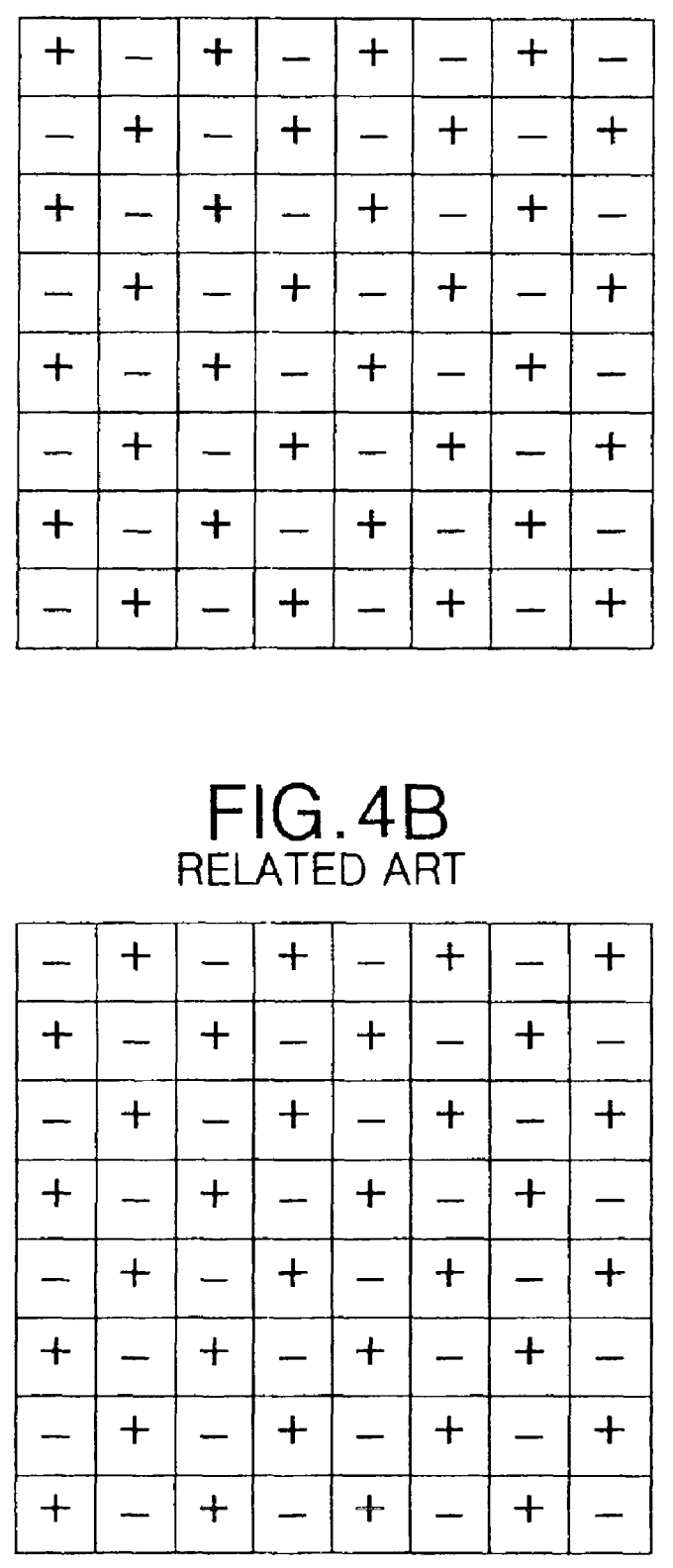

FIGS. 4A and 4B illustrate a dot inversion method of driving a related art liquid crystal display;

FIG. 5 illustrates a schematic view of a liquid crystal display according to one aspect of the present invention;

DETAILED DESCRIPTION OF THE ILLUSTRATED EMBODIMENTS

Figure 1:
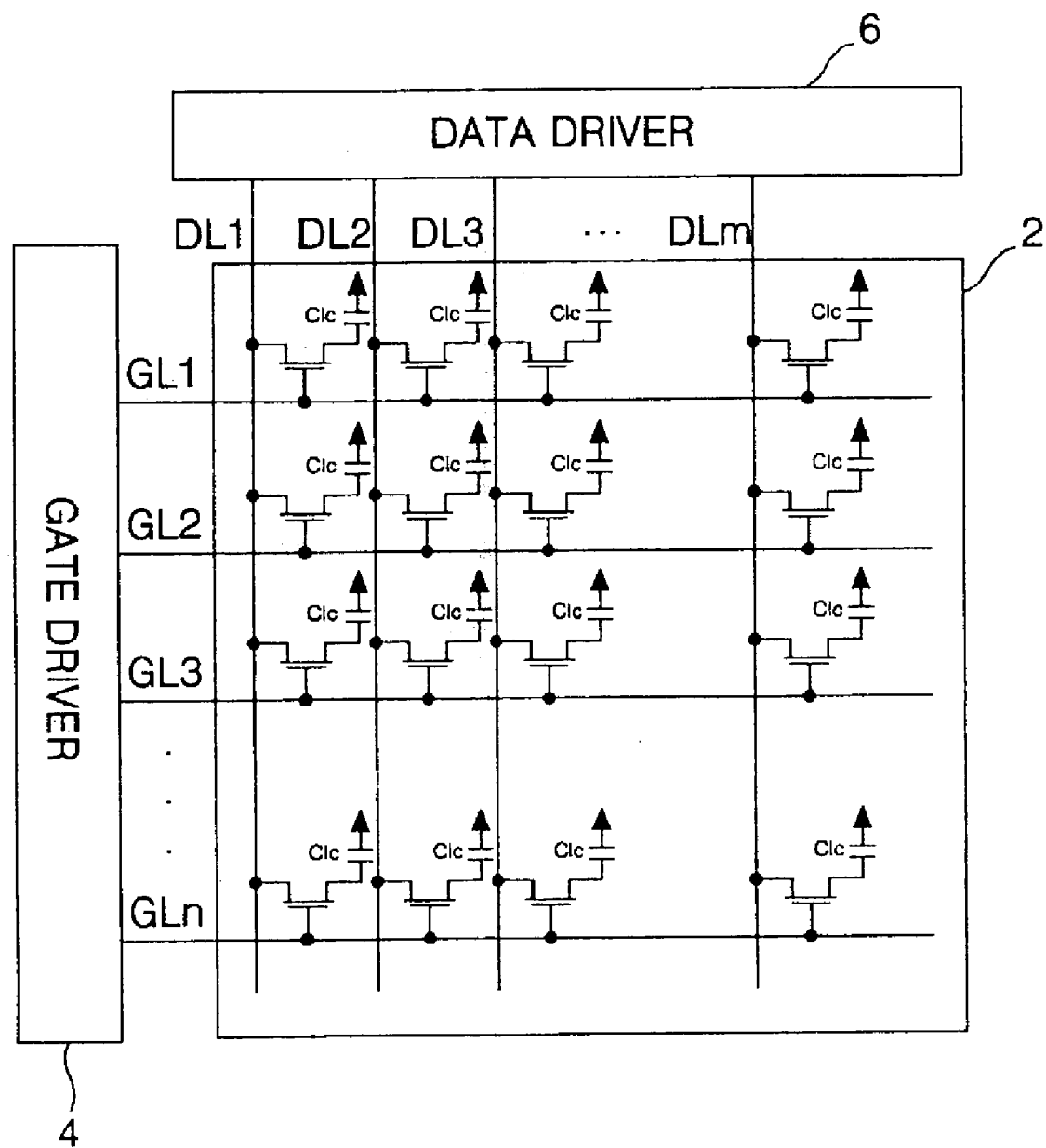
FIG. 1 illustrates a schematic view of a related art liquid crystal display.

Reference will now be made in detail to embodiments of the present invention, example of which is illustrated in the accompanying drawings.

FIG. 5 illustrates a schematic view of a liquid crystal display according to an aspect of the present invention.

Referring to FIG. 5, a liquid crystal display may, for example, include a liquid crystal display panel 12 having a plurality of liquid crystal cells arranged in a matrix pattern, a gate driver 14 for driving gate lines GL1 to GLn arranged in the liquid crystal display panel 12, a data driver 16 for driving data lines DL1 to DLm+1 also arranged in the liquid crystal display panel 12, and a timing controller 18 for controlling the gate and data drivers 14 and 16, respectively.

In one aspect of the present invention, a plurality of gate lines GL1 to GLn and a plurality of data lines DL1 to DLm+1 may be insulated from each other where they cross in the liquid crystal display panel 12. The liquid crystal cells, arranged in a matrix pattern, are provided at every crossing of the gate lines GL1 to GLn and the data lines DL1 to DLm+1. Each liquid crystal cell may include a thin film transistor (TFT) 11 connected to one of gate lines GL1 to GLn and a corresponding one of data lines DL1 to DLm+1.

Still referring to FIG. 5, liquid crystal cells consecutively arranged within a column may include TFTs 11 that are alternately connected left and right adjacent data lines DL. For example, liquid crystal cells arranged in odd numbered horizontal lines (e.g., liquid crystal cells including TFTs 11 connected to odd numbered gate lines GL1, GL3, GL5, etc.) may be connected to the first to $m^{th}$ data lines DL1 to DLm arranged in a −X axis direction with respect to a terminal connecting the TFT 11 to the gate line GL. Liquid crystal cells of even numbered horizontal lines (e.g., liquid crystal cells including TFTs 11 connected to even numbered gate lines GL2, GL4, GL6, etc.) may be connected to the second to $(m+1)^{th}$ data lines DL2 to DLm+1 arranged in a +X axis direction with respect to a terminal connecting the TFT 11 to the gate line GL.

In another aspect of the present invention, liquid crystal cells consecutively arranged within a column may include TFTs 11 that are alternately connected left and right adjacent data lines DL. For example, liquid crystal cells arranged in odd numbered horizontal lines (e.g., liquid crystal cells including TFTs 11 connected to odd numbered gate lines GL1, GL3, GL5, etc.) may be connected to the first to $m^{th}$ data lines DL1 to DLm arranged in a +X axis direction with respect to a terminal connecting the TFT 11 to the gate line GL. Liquid crystal cells of even numbered horizontal lines (e.g., liquid crystal cells including TFTs 11 connected to even numbered gate lines GL2, GL4, GL6, etc.) may be connected to the second to $(m+1)^{th}$ data lines DL2 to DLm+1 arranged in a −X axis direction with respect to a terminal connecting the TFT 11 to the gate line GL.

The TFTs 11 respond to gate signals applied to gate lines GL1 to GLn by supplying video signals, applied to the data lines DL1 to DLm+1, to the liquid crystal cells. Depending on the video signal applied to the data line, an orientation of liquid crystal molecules (not shown) included within the liquid crystal cell, between a common electrode (not shown) and a pixel electrode 13, may be altered and the light transmittance of the liquid crystal cell may thereby be controlled. Accordingly, as the light transmittances of each of the liquid crystal cells in the liquid crystal display panel are individually controlled, the liquid crystal display panel may display a picture.

The gate driver 14 scans and sequentially applies gate signals to the gate lines GL1 to GLn to drive the corresponding TFTs 11. The data driver 16 converts inputted video data into analog video signals and supplies analog video signals, specific to the scanned gate line, to the data lines DL1 to DLm+1 during the period when the gate signal is supplied to the scanned gate line. Additionally, the data driver 16 may convert inputted video data into analog video signals using gamma voltages supplied from a gamma voltage generator (not shown).

In one aspect of the present invention, the data driver 16 may supply video signals to data lines DL1 to DLm+1 using a column inversion driving method. For example, the data driver 16 may supply video signals having a first polarity to the odd numbered data lines DL1, DL3, etc., and supply video signals having a second polarity, opposite the first polarity, to the even numbered data lines DL2, DL4, etc. In one aspect of the present invention, the data driver 16 may supply video signals to the liquid crystal cells in the liquid crystal display illustrated in FIG. 5 via data lines DL1 to DLm+1 in every horizontal period. Alternatively, the data driver 16 may supply the video signals by shifting them to the right by one channel. Accordingly, the data driver 16 may be driven by a column inversion method and the video signals may be applied directly to the data lines or they may be shifted to the right by one channel before being applied to the data lines, thereby driving the liquid crystal cells of the liquid crystal display by a dot inversion method.

In one aspect of the present invention, the data driver 16 may apply video signals to odd numbered horizontal lines via the first to $m^{th}$ data lines DL1 to DLm. Subsequently, the data driver 16 may apply video signals to even numbered horizontal lines via the second to $(m+1)^{th}$ data lines DL2 to DLm+1 by shifting the previously applied video signals to the right by one channel to each of the data lines.

For example, in a first horizontal period when the first gate line GL1 is driven, video signals having a positive polarity applied from the data driver 16 may be supplied to the odd numbered liquid crystal cells connected to odd numbered data lines DL1, DL3, etc., while video signals having a negative polarity applied from the data driver 16 may be supplied to the even numbered liquid crystal cells connected to the even numbered data lines DL2, DL2, etc. Subsequently, in a second horizontal period when, for example, the second gate line GL2 is driven, the data driver 16 shifts the video signals applied in the first horizontal period to the right by one channel such that video signals having a negative polarity are applied to the odd numbered liquid crystal cells connected to the even numbered data lines DL2, DL4, etc., video signals having a positive polarity may be applied to the even numbered liquid crystal cells connected the odd numbered data lines DL3, DL5, etc., with the exception of the first data line DL1. Accordingly, the data driver 16 maybe driven by a column inversion method while liquid crystal cells of the liquid crystal display panel 12 may be driven by a dot inversion method.

In one aspect of the present invention, liquid crystal cells capable of expressing the same color may be arranged within the same column. For example, liquid crystal cells capable of expressing red (R) may be arranged within first, fourth, seventh, etc., ones of consecutive columns liquid crystal cells, liquid crystal cells capable of expressing green (G) may be arranged within the second, fifth, eighth, etc., ones of consecutive columns of liquid crystal cells, and liquid crystal cells capable of expressing blue (B) may be arranged within the third, sixth, ninth, etc., ones of consecutive columns of liquid crystal cells.

As shown in FIG. 5, consecutive liquid crystal cells, arranged within a column, may be alternately connected to left and right adjacent data lines and driven using a dot inversion method while the data driver is driven by a column inversion method. Accordingly, the liquid crystal display shown in FIG. 5 may consume a relatively small amount of power during its operation compared to liquid crystal displays using data drivers driven according to dot inversion methods such as those illustrated in FIG. 1.

When identical video signals are applied to the liquid crystal display illustrated in FIG. 5, a brightness expressed within first column and the last column is greater than a brightness expressed within the intermediate column and a large data swing width results in increased power consumption as will be explained in greater detail below with reference to FIG. 6.

Figure 6:
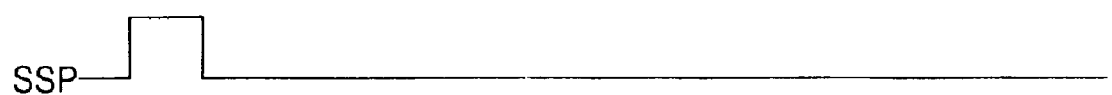
FIG. 6 illustrates a video signal applied to data lines of the liquid crystal display shown in FIG. 5.

Referring to FIG. 6, when a source start pulse (SSP) is provided at a high level, a blank signal (BK) may be applied to all the data lines DL1 to DLm+1. When a gate signal is applied, for example, to the first gate line GL1, a first red video data signal (R1) maybe supplied to the first, fourth, seventh, etc., data lines DL1, DL4, DL7, etc., a first green video data signal (G1) may be supplied to the second, fifth, eighth, etc., data lines DL2, DL5, DL8, etc., and a first blue video data signal (B1) may be supplied to the third, sixth, ninth, etc., data lines DL3, DL6, DL9, etc.

When a gate signal is applied, for example, to the second gate line GL2, a blank signal (BK) may be supplied to the first, fourth, seventh, etc., data lines DL1, DL4, DL7, etc., a second red video data signal (R2) may be supplied to the second, fifth, eighth, etc., data lines DL2, DL5, DL8, etc., and a second green video data signal (G2) may be supplied to the third, sixth, ninth, etc., data lines DL3, DL6, DL9, etc.

When a gate signal is applied, for example, to the third gate line GL3, a third red video data signal (R3) may be supplied to the first, fourth, seventh, etc., data lines DL1, DL4, DL7, etc., a third green video data signal (G3) may be supplied to the second, fifth, eighth, etc., data lines DL2, DL5, DL8, etc., and a third blue video data signal (B3) may be supplied to the third, sixth, ninth, etc., data lines DL3, DL6, DL9, etc.

Accordingly, red (R), green (G), and blue (B) video data signals may be supplied to all the data lines DL1 to DLm+1 in the above described manner. In the liquid crystal display shown in FIG. 5, video data signals of two colors are supplied to the second to $m^{th}$ data lines DL2 to DLm (e.g., green (G) and red (R) video data signals are alternately supplied to, for example, the second data line DL2 while blue (B) and green (G) video data signals are alternately supplied to, for example, the third data line DL3).

When video data signals specific to two colors are supplied to the second to $m^{th}$ data lines DL2 to DLm, a swing width of the video data signals becomes enlarged and power consumption of the liquid crystal display increases. If one color (e.g., red) is displayed on the liquid crystal display panel 12, a swing width of video data signal becomes even more enlarged. Further, a load of the second to $m^{th}$ data lines DL2 to DLm, receiving video data signals specific to two colors, is greater than a load of the first and $(m+1)^{th}$ data lines DL1 and DLm+1, receiving video data signals specific to only one color.

Accordingly, components of images generated via red (R) video data signals may, for example, be expressed by liquid crystal cells connected to the first data line DL1 at a relatively higher brightness than components of images generated via red (R) video data signals expressed by liquid crystal cells connected to second to $m^{th}$ data lines DL2 to DLm. Similarly, components of images generated via blue (B) video data signals may be expressed by liquid crystal cells connected to the $(m+1)^{th}$ data line at a relatively higher brightness than components of images generated via blue (R) video data signals expressed by liquid crystal cells connected to second to $m^{th}$ data lines DL2 to DLm.

Figure 7:
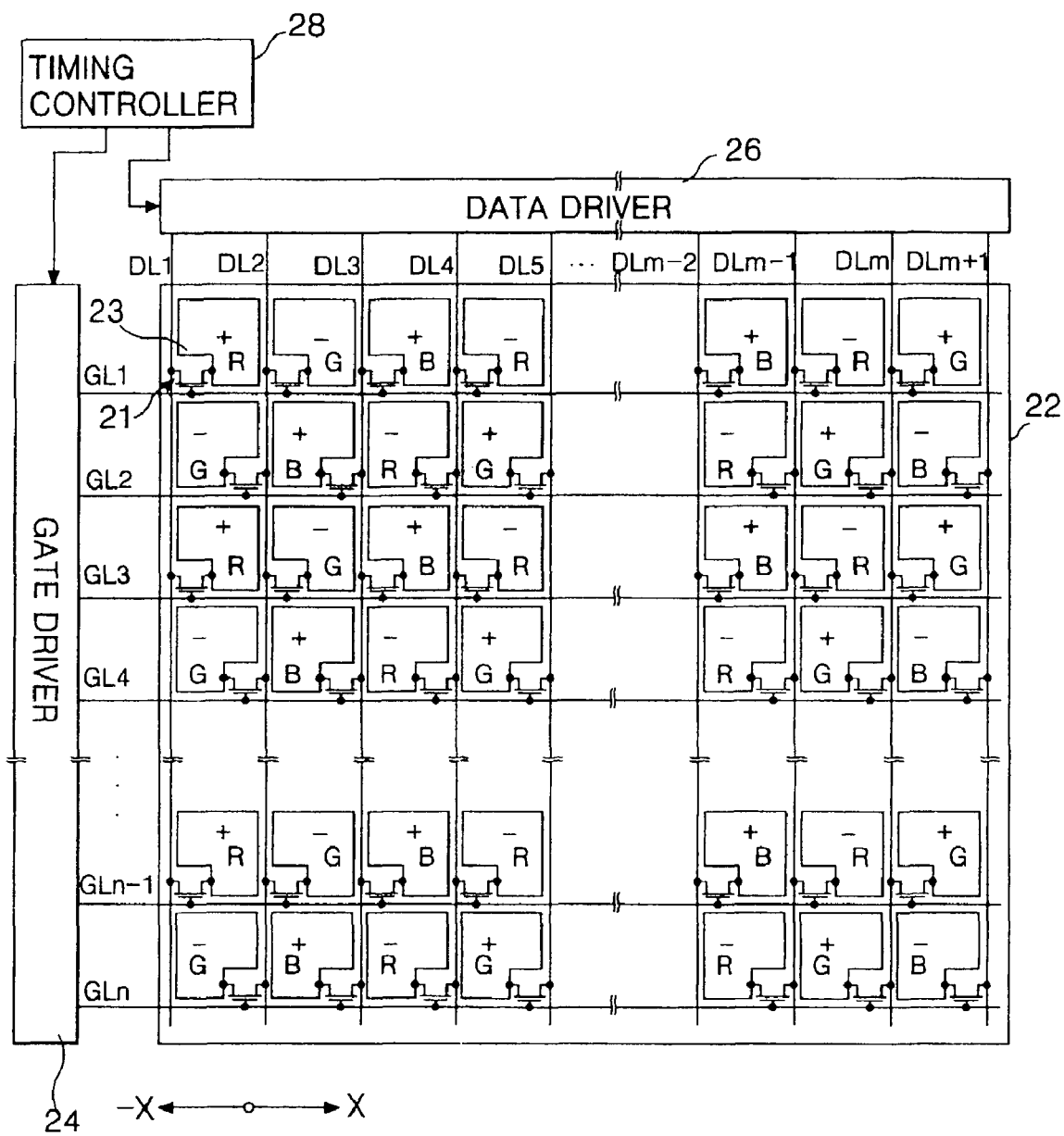
FIG. 7 illustrates a schematic view of a liquid crystal display according to another aspect of the present invention.

In accordance with the principles of another aspect of the present invention, and referring now to FIG. 7, a liquid crystal display may, for example, include a liquid crystal display panel 22 having a plurality of liquid crystal cells arranged in a matrix pattern, a gate driver 24 for driving gate lines GL1 to GLn arranged in the liquid crystal display panel 22, a data driver 26 for driving data lines DL1 to DLm+1 also arranged in the liquid crystal display panel 22, and a timing controller 28 for controlling the gate and data drivers 24 and 26, respectively.

In one aspect of the present invention, a plurality of gate lines GL1 to GLn and a plurality of data lines DL1 to DLm+1 may be insulated from each other where they cross in the liquid crystal display panel 22. The liquid crystal cells, arranged in a matrix pattern, are provided at every crossing of the gate lines GL1 to GLn and the data lines DL1 to DLm+1. Each liquid crystal cell may include a thin film transistor (TFT) 21 connected to one of gate lines GL1 to GLn and a corresponding one of data lines DL1 to DLm+1.

Still referring to FIG. 7, liquid crystal cells consecutively arranged within a column may include TFTs 21 that are alternately connected left and right adjacent data lines DL. For example, liquid crystal cells arranged in odd numbered horizontal lines (e.g., liquid crystal cells including TFTs 21 connected to odd numbered gate lines GL1, GL3, GL5, etc.) may be connected to the first to $m^{th}$ data lines DL1 to DLm arranged in a −X axis direction with respect to a terminal connecting the TFT 21 to the gate line GL. Liquid crystal cells of even numbered horizontal lines (e.g., liquid crystal cells including TFTs 21 connected to even numbered gate lines GL2, GL4, GL6, etc.) may be connected to the second to $(m+1)^{th}$ data lines DL2 to DLm+1 arranged in a +X axis direction with respect to a terminal connecting the TFT 21 to the gate line GL.

In another aspect of the present invention, liquid crystal cells consecutively arranged within a column may include TFTs 21 that are alternately connected left and right adjacent data lines DL. For example, liquid crystal cells arranged in odd numbered horizontal lines (e.g., liquid crystal cells including TFTs 21 connected to odd numbered gate lines GL1, GL3, GL5, etc.) may be connected to the first to $m^{th}$ data lines DL1 to DLm arranged in a +X axis direction with respect to a terminal connecting the TFT 21 to the gate line GL. Liquid crystal cells of even numbered horizontal lines (e.g., liquid crystal cells including TFTs 21 connected to even numbered gate lines GL2, GL4, GL6, etc.) may be connected to the second to $(m+1)^{th}$ data lines DL2 to DLm+1 arranged in a −X axis direction with respect to a terminal connecting the TFT 21 to the gate line GL.

The TFTs 21 respond to gate signals applied to gate lines GL1 to GLn by supplying video signals, applied to the data lines DL1 to DLm+1, to the liquid crystal cells. Depending on the video signal applied to the data line, an orientation of liquid crystal molecules (not shown) included within the liquid crystal cell, between a common electrode (not shown) and a pixel electrode 23, may be altered and the light transmittance of the liquid crystal cell may thereby be controlled. Accordingly, as the light transmittances of each of the liquid crystal cells in the liquid crystal display panel are individually controlled, the liquid crystal display panel may display a picture.

The gate driver 24 scans and sequentially applies gate signals to the gate lines GL1 to GLn to drive the corresponding TFTs 21. The data driver 26 coverts inputted video data into analog video signals and supplies analog video signals, specific to the scanned gate line, to the data lines DL1 to DLm+1 during the period when the gate signal is supplied to the scanned gate line. Additionally, the data driver 26 may convert inputted video data into analog video signals using gamma voltages supplied from a gamma voltage generator (not shown).

In one aspect of the present invention, the data driver 26 may supply video signals to data lines DL1 to DLm+1 using a column inversion driving method. For example, the data driver 26 may supply video signals having a first polarity to the odd numbered data lines DL1, DL3, etc., and supply video signals having a second polarity, opposite the first polarity, to the even numbered data lines DL2, DL4, etc. In one aspect of the present invention, the data driver 26 may supply video signals to the liquid crystal cells in the liquid crystal display illustrated in FIG. 7 via data lines DL1 to DLm+1 in every horizontal period. Alternatively, the data driver 26 may supply the video signals by shifting them to the right by one channel. Accordingly, the data driver 26 may be driven by a column inversion method and the video signals may be applied directly to the data lines or they may be shifted to the right by one channel before being applied to the data lines, thereby driving the liquid crystal cells of the liquid crystal display by a dot inversion method.

In one aspect of the present invention, liquid crystal cells capable of expressing different colors are alternately arranged within the same column. For example, liquid crystal cells capable of expressing red (R) and green (G) colors may be alternately arranged within the first, fourth, seventh, etc., ones of consecutive columns of liquid crystal cells, liquid crystal cells capable of expressing green (G) and blue (B) colors may be alternately arranged within the second, fifth, eighth, etc., one of consecutive columns of liquid crystals, and liquid crystal cells capable of expressing blue (B) and red (R) colors may be alternately arranged in the third, sixth, ninth, etc., ones of consecutive columns of liquid crystal cells.

In one aspect of the present invention, consecutive ones of liquid crystal cells capable of expressing red (R), green (G), and blue (B) colors within columns of liquid crystal cells may, for example, be alternately connected to left and right adjacent data lines and driven by a dot inversion method while the data driver is driven by a column inversion method. In another aspect of the present invention, liquid crystal cells capable of expressing red (R), green (G), and blue (B) colors within adjacent columns of liquid crystal cells may, for example, be alternately connected to a data line arranged between the adjacent columns of liquid crystal cells (e.g., a reference data line). For example, liquid crystal cells capable of expressing the color red (R) may be connected to an $i^{th}$ data line DLi (wherein i is an integer, for example, 1, 4, 7, etc.), such that liquid crystal cells capable of expressing the color red (R) in an $i^{th}$ column of successive liquid crystal cells are alternately connected to the $i^{th}$ data line DLi. Accordingly, video signal specific to a single color may be applied to a single data line, as will be described in greater detail below with reference to FIG. 8.

Figure 8:
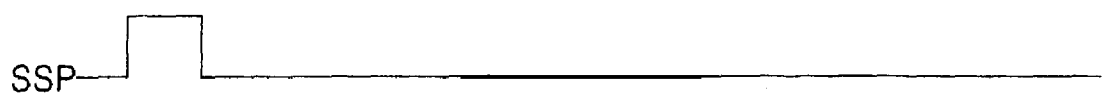
FIG. 8 illustrates a video signal applied to data lines of the liquid crystal display shown in FIG. 7.

Referring to FIG. 8, when a source start pulse (SSP) is provided at a high level, a blank signal (BK) may be applied to all the data lines DL1 to DLm+1. When a gate signal is applied, for example, to the first gate line GL1, a first red video data signal (R1) may be supplied to the first, fourth, seventh, etc., data lines DL1, DL4, DL7, etc., a first green video data signal (G1) may be supplied to the second, fifth, eighth, etc., data lines DL2, DL5, DL8, etc., and a first blue video data signal (B1) may be supplied to the third, sixth, ninth, etc., data lines DL3, DL6, DL9, etc.

When a gate signal is applied, for example, to the second gate line GL2, a blank signal (BK) may be supplied to the first, fourth, seventh, etc., a second green video data signal (G2) may be supplied to the second, fifth, eighth, etc., data lines DL2, DL5, DL8, etc., and a second blue video data signal (B2) may be supplied to the third, sixth, ninth, etc., data lines DL3, DL6, DL9, etc.

When a gate signal is applied, for example, to the third gate line GL3, a third red video data signal (R3) may be supplied to the first, fourth, seventh, etc., data lines DL1, DL4, DL7, etc., a third green video data signal (G3) may be supplied to the second, fifth, eighth, etc., data lines DL2, DL5, DL8, etc., and a third blue video data signal (B3) may be supplied to the third, sixth, ninth, etc., data lines DL3, DL6, DL9, etc.

In one aspect of the present invention, video data signals specific to one color may be supplied to each of the data lines DL1 to DLm+1 thereby minimizing a load difference between the first and $(m+1)^{th}$ data lines DL1 and DLm+1 and the second to $m^{th}$ data lines DL2 to DLm.

Accordingly, consecutive ones of liquid crystal cells capable of expressing a single color within a column may be connected to one adjacent data line. Further, consecutive ones of liquid crystal cells capable of expressing the same color within a adjacent columns may be alternately connected along the length of the same data line (e.g., the reference data line). Accordingly, video data signals specific to one color may be received by any data line, a swing width of the video data signals may be reduced, and the amount of power consumed by the liquid crystal display may be reduced.

In another aspect of the present invention, liquid crystal cells capable of expressing, for example, red (R) and green (G) colors may be alternately arranged within the first of successive columns. In another aspect of the present invention, liquid crystal cells capable of expressing, for example, green (G) and blue (B) colors may be alternately arranged within the last of successive columns. Accordingly, a variance in brightness of liquid crystal cells arranged in the first and last columns, and capable of expressing red (R) and blue (B) colors, may be minimized with respect to other liquid crystal cells in other columns that are capable of expressing red (R) and blue (B) colors.

The liquid crystal display illustrated in FIG. 7 may express colors more evenly than compared to a stripe-like color expression generated by the liquid crystal display illustrated in FIG. 5. The liquid crystal display illustrated in FIG. 7 may prevent brightness variances from being expressed outside a predetermined tolerance. For example, images expressed by liquid crystal displays containing columns of liquid crystal cells capable of expressing a single color cannot prevent a colored stripe pattern from appearing. Images may be expressed by the liquid crystal display shown in FIG. 7 while preventing any one color from appearing too bright, thereby eliminating the striping phenomenon.

As described above, according to the present invention, liquid crystal cells capable of expressing the same color may be alternately arranged adjacent left and right sides along a length of each of the data lines. Accordingly, a swing width of the video data signals, and thus power consumption characteristics, may be reduced. According to the principles of one aspect of the present invention, video data signals specific to a single color may be applied to a single data line such that a load difference between the lines may be minimized. According to principles of another of the present invention, liquid crystal cells capable of expressing two colors may be alternately arranged in the first and last ones of successive columns such that a liquid crystal display may be prevented from expressing colors to an excessive brightness.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:
1. A liquid crystal display, comprising:
a liquid crystal display panel;
a plurality of gate lines;
a plurality of successive data lines crossing the plurality of gate lines, wherein a data voltage of a first polarity is applied to at least one of the data lines, and a data voltage of a polarity opposite the first polarity is applied to another data line adjacent thereto; and
a plurality of liquid crystal cells for expressing red, green, and blue colors, arranged in successive columns defined by at least one adjacent data line of the plurality of successive data lines and arranged at crossings of the plurality of gate lines and the plurality of data lines,
wherein consecutive liquid crystal cells within a column are alternately connected to left and right adjacent data lines,
wherein liquid crystal cells for expressing the same color are alternately connected to and arranged at left and right sides along a length of at least one of the plurality of data lines, and wherein data voltages of same polarity are applied to liquid crystal cells of the plurality of liquid crystal cells that are connected to same data line to express the same color.

2. The liquid-crystal display according to claim 1, further comprising liquid crystal cells for expressing two colors alternately arranged within the same column.

3. The liquid crystal display according to claim 1, further comprising liquid crystal cells for expressing red and green colors alternately arranged within $i^{th}$ ones of successive columns.

4. The liquid crystal display according to claim 1, further comprising liquid crystal cells for expressing green and blue colors alternately arranged within $(i+1)^{th}$ ones of successive columns.

5. The liquid crystal display according to claim 1, further comprising liquid crystal cells for expressing blue and red colors alternately arranged within the $(i+2)^{th}$ ones of successive columns.

6. The liquid crystal display according to claim 1, further comprising one of a red, green, and blue video data signal applied to each of the plurality of data lines.

7. A liquid crystal display, comprising:
   gate lines;
   data lines crossing the gate lines; and
   a plurality of red, green, and blue liquid crystal cells arranged at crossings of the gate and data lines,
   wherein liquid crystal cells for expressing identical colors are alternately connected to and arranged at left and right sides along a length of at least one of the of data lines,
   wherein a data voltage of a first polarity is applied to at least one of the data lines, and a data voltage of a polarity opposite the first polarity is applied to another data line adjacent thereto, and
   wherein data voltages of same polarity are applied to the liquid crystal cells that are connected to same data line to express the same color.

8. The liquid crystal display according to claim 7, further comprising liquid crystal cells for expressing two colors alternately arranged within the same column.

9. The liquid crystal display according to claim 8, further comprising liquid crystal cells for expressing red and green colors alternately arranged within $i^{th}$ one of successive columns.

10. The liquid crystal display according to claim 9, further comprising liquid crystal cells for expressing green and blue colors alternately arranged within $(i+1)^{th}$ ones of successive columns.

11. The liquid crystal display according to claim 9, further comprising liquid crystal cells for expressing blue and red colors alternately arranged within $(i+2)^{th}$ ones of successive columns.

12. The liquid crystal display according to claim 7, further comprising one of a red, green, and blue video signals applied to each of the data lines.

13. The liquid crystal display according to claim 7, liquid crystal cells consecutively arranged within a column are alternately connected to left and right adjacent data lines.

* * * * *